(12) United States Patent
Choi et al.

(10) Patent No.: US 7,544,631 B2
(45) Date of Patent: Jun. 9, 2009

(54) C AND N-DOPED TITANIUMOXIDE-BASED PHOTOCATALYTIC AND SELF-CLEANING THIN FILMS AND THE PROCESS FOR PRODUCTION THEREOF

(75) Inventors: Won-Kook Choi, Seoul (KR); Yeon-Sik Jung, Seoul (KR); Dong-Heon Kang, Gyeonggi-do (KR); Kyung-Ju Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 297 days.

(21) Appl. No.: 11/380,361

(22) Filed: Apr. 26, 2006

(65) Prior Publication Data

US 2006/0247125 A1    Nov. 2, 2006

(30) Foreign Application Priority Data

Apr. 27, 2005    (KR)    .............. 10-2005-0035184

(51) Int. Cl.
| | |
|---|---|
| B01J 21/18 | (2006.01) |
| B01J 27/24 | (2006.01) |
| B01J 23/00 | (2006.01) |
| C23C 8/00 | (2006.01) |
| C23C 8/80 | (2006.01) |
| C23C 14/00 | (2006.01) |
| C23C 16/00 | (2006.01) |
| B05D 1/08 | (2006.01) |

(52) U.S. Cl. ............... 502/180; 502/200; 502/350; 148/206; 148/210; 148/216; 148/240; 148/277; 427/446; 427/453; 427/255.36; 427/255.11; 427/255.19; 427/255.23; 427/255.26

(58) Field of Classification Search .......... 502/180, 502/200, 350; 148/206, 210, 216, 240, 277; 427/446, 453, 255.36, 255.11, 255.19, 255.23, 427/255.26

See application file for complete search history.

(56) References Cited

U.S. PATENT DOCUMENTS 3,784,402 A * 1/1974 Reedy, Jr. ............... 428/457

(Continued)

FOREIGN PATENT DOCUMENTS

| JP | 02-122448 | * | 5/1990 |
| JP | 11-012720 | * | 1/1999 |
| WO | WO 2006/115318 | * | 11/2006 |

OTHER PUBLICATIONS

"Synthesis and characterization of carbon-doped titania as an artificial solar light sensitive photocatalyst," Yuanzhi Li et al. Chemical Physics Letters 404 (2005), pp. 25-29.*

(Continued)

*Primary Examiner*—Patricia L Hailey
(74) *Attorney, Agent, or Firm*—Darby & Darby P.C.

(57) ABSTRACT

The present invention provides for titanium oxide-based photocatalysts having a general formula of $TiO_{2-X-\delta}C_XN_\delta$ and self-cleaning materials that are prepared by substituting O of pure TiO2 with C and N. A preparation method comprising a process for forming thin films of $TiO_{2-X-\delta}C_XN_\delta$ by using gases such as Ar, $N_2$, $CO_2$, CO and O are used for reactive sputtering, and a process of heat treating at around 500° C., thereby crystallizing, is provided. The titanium oxide-based photocatalysts having a general formula of $TiO_{2-X-\delta}C_XN_\delta$ and self-cleaning materials according to the present invention have a smaller optical bandgap compared to pure titanium oxides, and therefore, the photocatalysts can be activated under the visible light range. In addition, they comprise only pure anatase crystallization phase, and since the crystallized particles are small in size, the efficiency and self-cleaning effect of the photocatalysts are very high.

25 Claims, 13 Drawing Sheets

U.S. PATENT DOCUMENTS

| | | | | |
|---|---|---|---|---|
| 4,346,123 | A | * | 8/1982 | Kaufmann .................. 427/580 |
| 5,336,292 | A | * | 8/1994 | Weinl et al. ..................... 75/230 |
| 6,652,913 | B2 | * | 11/2003 | Ruppi et al. .......... 427/255.391 |
| 6,743,749 | B2 | * | 6/2004 | Morikawa et al. ........... 502/349 |
| 6,835,688 | B2 | * | 12/2004 | Morikawa et al. ........... 502/200 |
| 7,175,911 | B2 | * | 2/2007 | Zhou et al. .................. 428/403 |
| 2005/0226761 | A1 | * | 10/2005 | Orth-Gerber et al. ........ 420/417 |
| 2007/0092734 | A1 | * | 4/2007 | Durandeau et al. .......... 428/432 |

OTHER PUBLICATIONS

"IR and XPS investigation of visible-light photocatalysis—Nitrogen-carbon-doped TiO2 film," Jing Yang et al. Applied Surface Science 253 (2006), pp. 1998-1994.*

"Visible-light photocatalysis in nitrogen-carbon doped TiO2 films obtained by heating TiO2-gel film in an ionized N2 gas," Jing Yang et al. Thin Solid Films 516 (2008), pp. 1736-1742.*

Preparation and enhanced daylight-induced photocatalytic activity of C,N,S-tridoped titanium dioxide powders, Minghua Zhou et al. Journal of Hazardous Materials 152 (2008), pp. 1229-1236.*

Search Report for PCT/KR2005/004281.*

Shahed U. M. Khan et al., "Efficient Photochemical Water Splitting by a Chemically Modified n-$TiO_2$", *Science*, vol. 297 pp. 2243-2245, Sep. 27, 2002.

D.C. Cronemeyer, "Infrared Absorption of Reduced Rutile $TiO_2$ Single Crystals", *Physical Review*, vol. 113, No. 5, pp. 1222-1226, Mar. 1, 1959.

R. G. Breckenridge et al., "On the Intermetallic Compounds Indium Antimonide, Gallium Antimonide, and Aluminum Antimonide", *Physica XX*, No. 11, 68, pp. 1073-1076 (1954).

Dong Hyun Kim et al., "Photoelectrocatalytic Degradation of Formic Acid Using a Porous $TiO_2$ Thin-Film Electrode", *Environ. Sci. Technol.*, (1994), vol. 28, No. 3, pp. 479-483.

Akira Fujishima et al., "Electrochemical Photolysis of Water at a Semiconductor Electrode", *Nature*, vol. 238, pp. 37-38, Jul. 7, 1972.

Amal K. Ghosh et al., "Photoelectrolysis of Water in Sunlight with Sensitized Semiconductor Electrodes", *J. Electrochem. Soc.: Electrochemical Science and Technology*, vol. 124, No. 10, pp. 1516-1522, Oct. 1977.

John F. Moulder et al., "Handbook of X-ray Photoelectron Spectroscopy", pp. 72-73.

G. Li et al., "Structural characterization of $TiC_x$ films prepared by plasma based ion implantation", *Thin Solid Films*, 396(2001) pp. 16-22.

Wonyong Choi et al., "The Role of Metal Ion Dopants in Quantum-Sized $TiO_2$: Correlation between Photoreactivity and Charge Carrier Recombination Dynamics", *J. Phys. Chem.* vol. 98, pp. 13669-13679, (1994).

Q. N. Zhao et al., "XPS Study of N-doped $TiO_x$ Thin Films Prepared by D.C. Reactive Magnetron Sputtering", *Key engineering Materials*, vol. 249 (2003) pp. 457-461.

R. Asahi et al., "Visible-Light Photocatalysis in Nitrogen-Doped Titanium Oxides", Science, vol. 293, pp. 269-271, Jul. 13, 2001.

* cited by examiner (a)  (b)

(c)  (d)

(a)  (b)

C AND N-DOPED TITANIUMOXIDE-BASED PHOTOCATALYTIC AND SELF-CLEANING THIN FILMS AND THE PROCESS FOR PRODUCTION THEREOF

BACKGROUND OF THE INVENTION

1. Field of the Invention

The present invention relates to titanium oxide-based photocatalysts and self-cleaning materials and the method of preparation thereof. More particularly, the present invention relates to titanium oxide-based photocatalysts having a general formula of $TiO_{2-X-\delta}C_XN_\delta$ and self-cleaning materials that are prepared by using a process wherein thin films that have a part of oxygen from $TiO_2$ is substituted with C and N by using gases such as $N_2$, $CO_2$, $CO$ are formed, followed by heat treating at a relatively low temperature of about 500° C.

2. Background of the Related Art

Considering the exhaustion of fossil fuels, global warming or environmental problems, the technology for applying sunlight energy that is clean and safe is currently in need. Since Fujishma and Honda have discovered that photocatalysts can be used in decomposition of water and produce hydrogen (A. Fujishima and K. Honda, *Nature*, 238, 37-38, 1972), there have been many research attempts to use photocatalysts for converting solar energy and to apply them in solar battery. There are a number of materials that can be used for a photocatalyst, however, a representative example is $TiO_2$. Some of the advantages of using $TiO_2$ are that it is chemically stable, harmless to human bodies, and relatively inexpensive compared with other materials.

However, since pure $TiO_2$ photocatalysts can only use ultraviolet rays, the overall efficiency is low, making it difficult to put them into a practical use. Therefore, there has been a need to develop titanium oxide-based photocatalysts that can be activated under the visible light range by lowering the bandgap of $TiO_2$.

On the other hand, irradiation of an ultraviolet ray to the surface of $TiO_2$ makes the surface very hydrophilic. Therefore, the surface does not easily get contaminated with foreign materials, and even if it is contaminated with foreign materials, the foreign materials are decomposed into smaller materials due to the oxidation/decomposition reaction of the photocatalyst. It can be expected that a natural rainfall thereafter would easily cleanse away the materials due to ultra hydrophilic property. Such is so-called the self-cleaning effect and it can be widely used on the surface of glass windows of buildings, glass windows, rear-view mirrors, bodies of automobiles and surfaces of bedpans.

However, these $TiO_2$ photocatalysts, as mentioned above, fall short of their efficiency due to the fact that they can only react at ultraviolet ray range as their energy bandgap is between 3.0 to 3.2 eV. Therefore, in order to also increase the self-cleaning effect, titantium oxide-based photocatalysts that can be activated in the visible light range are also in need.

Many efforts were made to develop titanium oxide-based photocatalysts that exhibit excellent activities under a visible light. As an example thereof include:

1) Method for substituting the Ti part of $TiO_2$ with a transition metal (A. K. Ghosh, H. P. Maruska, *J. Electrochem. Soc. Rev.* 124, 1516, 197 and W. Choi et al., *J. Phys. Chem.* 98, 13669, 1994);

2) Method for incorporating oxygen vacancy into $TiO_2$ (R. G. Breckenridge, W. R. Hosler, *Phys. Rev.* 91, 793, 1953 and D. C. Cronemeyer, *Phys. Rev.* 113, 1222, 1959);

3) Method for substituting the O part of $TiO_2$ with nitrogen (R. Asahi, T. Morikawa, T. Ohwaki, K. Aoki, Y. Taga, *Science* 293, 269, 2001); and 4) Method for substituting the O part of $TiO_2$ with carbon (Shahed U. M. Khan, M. Al-Shahry, William B. Ingler Jr. *Science* 297, 2243, 2002).

When the part of Ti of $TiO_2$ is substituted with a transition metal, although photocatalytic activities such as visible light absorption capability and visible light reactivity can be endowed, the photocatalytic activities are low and the photocatalytic activities of the $TiO_2$ having the original ultraviolet ray range are rapidly reduced, thereby decreasing even more the activities under sunlight illumination. Moreover, the substitution with a transition metal requires high-cost equipment.

For $TiO_2$ with an oxygen vacancy, it has been reported that the reaction efficiency of photocatalysts is significantly increased because the oxygen vacancy produced by lack of oxygen becomes a site for hole electron recombination.

Thin film photocatalysts of pure $TiO_2$ that have a part of oxygen substituted with nitrogen are represented by a general formula of $TiO_{2-X}N_X$. The thin photocatalysts are prepared by first forming thin films on glass plates by having $TiO_2$ target undergo RF Magnetron Sputtering in $N_2(40\%)/Ar$ combination of gas, then followed by 4 hours of heat treatment at 550° C. under $N_2$ gas again, thereby crystallizing (a mixed phase of anatase and rutile). The thin film photocatalysts having a general formula of $TiO_{2-X}N_X$ have an absorption edge moved more than 100 nm towards the ultraviolet A range compared to that of $TiO_2$. As a result, the activities of the thin film photocatalysts having a general formula of $TiO_{2-X}N_X$ and pure $TiO_2$ photocatalysts were almost equivalent under ultraviolet irradiation, however, 5 times or more of photocatalytic activities of pure $TiO_2$ photocatalysts were shown for the thin film photocatalysts having a general formula of $TiO_{2-X}N_X$ under irradiation of visible light at wavelength of 410 nm or more.

On the other hand, for photocatalysts that have a part of oxygen of $TiO_2$ substituted with carbon and have a general formula of $TiO_{2-X}C_X$, mixed phases of Ti metal rutile and anatase $TiO_2$ were prepared using flame method at a high temperature of 850° C., and it has been reported that the visible light absorption edge of the photocatalysts were moved to 530 nm range.

As discussed above, by having $TiO_2$ substituted with negative or positive ions and thereby increasing the light absorption in the visible light range, many efforts to improve the properties of photocatalysts were made and found that particularly substituting with negative ions was more effective. However, even with the nitrogen substitution, which is known to have the most effective property, not only anatase phase, which has a good photocatalytic property, but also rutile phase, was obtained as a mixture. Furthermore, with the carbon substitution, Ti metal phase in addition to anatase phase and rutile phase also was mixed, and thus, a problem of the low efficiency of the photocatalysts exists.

Therefore, development of a highly efficient titanium oxide-based photocatalysts that can be activated under the visible light and those that comprise only anatase phase is still in need.

BRIEF DESCRIPTION OF THE INVENTION

The object of the present invention is to provide titanium oxide-based photocatalysts that is activated in the visible light range, only consisted of anatase phase, have an increased surface area of their crystallized particles, and thus have high efficiency and excellent cleaning effect, self-cleaning materials and the method for preparing thereof.

The thin film titanium oxide-based photocatalysts and the self-cleaning materials of the present invention have a general formula of $TiO_{2-X-\delta}C_XN_\delta$, wherein $0<X+\delta<0.22$, $0<X<0.2$, and $0<\delta<0.02$. That is, a part of oxygen of $TiO_2$ of the titanium oxide-based photocatalysts are substituted with nitrogen and carbon.

According to the above-mentioned general formula of $TiO_{2-X-\delta}C_XN_\delta$, X and δ values that represent the ratio of substitution with carbon and nitrogen are almost equivalent; however, it is preferable that X value is larger than δ value. That is, it is preferable to have more carbon substitutions compared to nitrogen substitutions.

Method of preparing thin film of titanium oxide-based photocatalysts of the present invention that have a general formula of $TiO_{2-X-\delta}C_XN_\delta$ comprises (1) formation process of thin films by using Ti and inert gas, $N_2$ and CO as mixed gas by reactive sputtering, and (2) heat treating process of the formed thin film at a temperature between 450° C. and 550° C. for 2 to 4 hours, thereby crystallizing.

The titanium oxide-based photocatalysts having a general formula of $TiO_{2-X-\delta}C_XN_\delta$ and self-cleaning materials of the present invention has a smaller optical bandgap than titanium oxides, and thus can be activated under visible light range. Moreover, they have pure anatase crystallization, and the crystallized particles are small, resulting in a very high reactivity thereof.

DETAILED DESCRIPTION OF THE INVENTION

Figure 1:
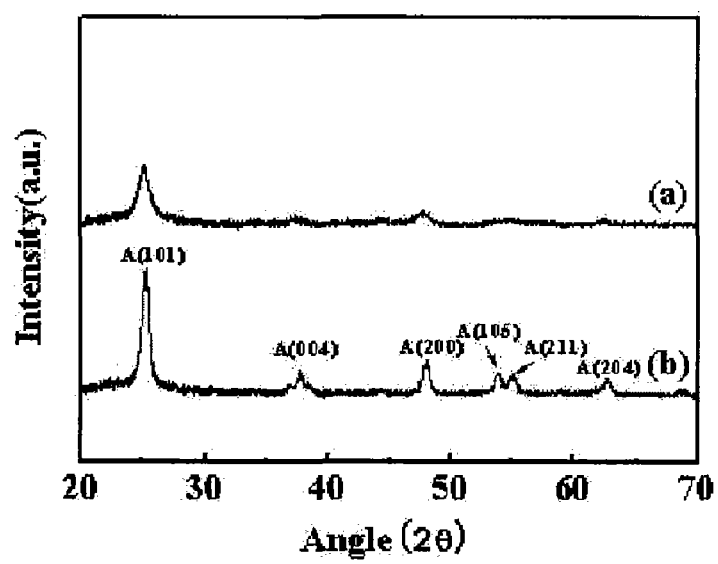
FIG. 1 is a graph of XRD of thin films manufactured on a glass by using $N_2+CO_2$ (a) and $N_2+CO$ (b) as reaction gases and sputtering Ti metal target.

In order to prepare the thin film of titanium oxide-based photocatalysts having a general formula of $TiO_{2-X-\delta}C_XN_\delta$ to achieve the object of the present invention, changes in crystallization, absorption of visible light and X-ray photoelectron spectrum, etc. were examined in accordance with variation in reaction gases and heat treatment temperatures in the above-mentioned processes and the results in detail will be followed below.

Before explaining the results from the above-mentioned irradiations, method for preparing $TiO_{2-X-\delta}C_XN_\delta$ thin film according to the present invention would be explained in detail.

For plates to be used for preparing thin films, nonalkali glass plates (Eagle 2000) are used. In order to remove foreign materials from the plates, the plates go through ultrasound cleaning process using in the following order of acetone, methanol, ethanol, DI-water (10 minutes for each), and then they are dried in nitrogen gas (99.9% pure) to be placed into chamber immediately. For the target, 99.9% pure 2 inch Ti metal target was used, and for the reaction gas for sputtering, inert gas such as Ar(4N) and $N_2$(4N), $CO_2$(4N), $CO_2$(4N), $O_2$(4N) selected according to the object of each experiment was used. MFC (Mass Flow Controller) was used, controlling the unit by sccm (standard cc per minute). In order to obtain a desired degree of vacuum before sputtering, it was vacuumed until $5\times10^{-2}$ Torr using a Rotary pump, followed by vacuuming until $5\times10^{-6}$ Torr using a Diffusion pump. Once the desired degree of vacuum was obtained, in order to remove contaminants and oxide layers that were formed on the target surface due to exposure while waiting, pre-sputtering was carried out under the conditions of DC power 0.7 A, Argon gas and 60 sccm for about 10 minutes until the plasma color of pink turned blue. The distance between the target and the glass substrates during sputtering was 7.5 cm, and temperature of the plates was maintained at 250° C.

Thin films having thickness of 100~300 nm were manufactured by converting the ratio of mixed gases of $CO_2+N_2$, $CO+N_2$, i.e. the ratio of $CO_2/N_2$, $CO/N_2$, which is a reaction gas used in the process of forming the thin films of $TiO_{2-X-\delta}C_XN_\delta$ to 0.06~0.125 while making the working pressure of 10 to 20 torr.

The process of crystallization (2) was carried out by heat treating for 2 to 4 hours at 450 to 550° C. The thin film manufacturing conditions are briefly listed in Table 1.

TABLE 1

Sputtering Conditions of thin films of $TiO_{2-X-\delta}C_XN_\delta$

| | |
|---|---|
| Base pressure | $5 \times 10^{-6}$ Torr |
| Working pressure | 10~20 mTorr |
| Substrate temperature | Room temperature~400° C. |
| Deposition time | 40~60 min |
| Target | Ti |
| Substrate | Glass (eagle2000) |
| Reactive sputter gas | Ar, CO, $O_2$, $CO_2$, $N_2$ |
| Power | 0.3 Amp, 400 V |
| Annealing temperature | 450-550° C. |
| Annealing time | 2-4 hr |

The changes in crystallinity of thin film according to changes of reaction gas of the thin films of $TiO_{2-X-\delta}C_XN_\delta$ under the above-mentioned condition was analyzed using XRD.

Figure 2:
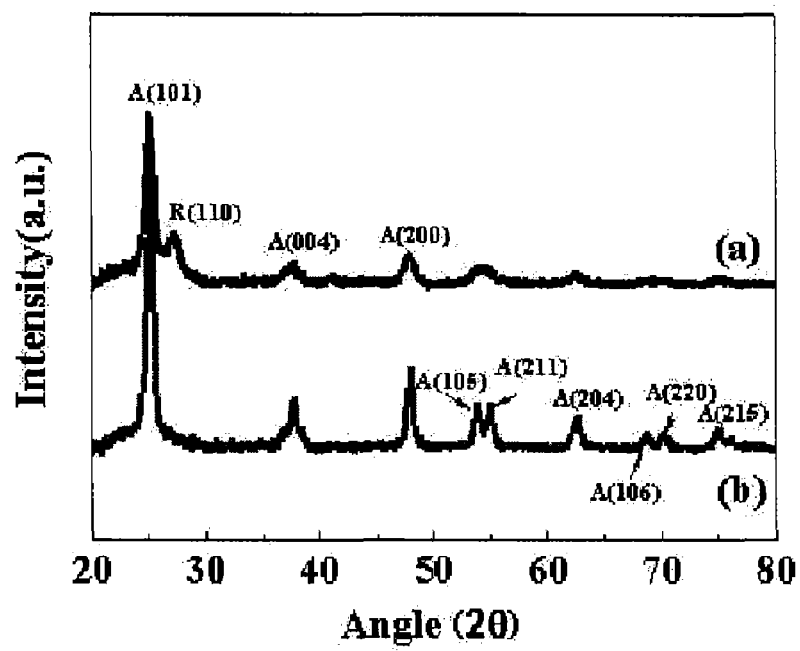
FIG. 2 shows XRD of thin films manufactured on a glass by using $Ar+N_2+CO_2$ (a) and $Ar+N_2+CO$ (b) as reaction gases and sputtering Ti metal target.

FIG. 1 shows a graph of XRD of thin films manufactured using $N_2+CO_2$ (a) and $N_2+CO$ (b) as reaction gases, and FIG. 2 shows XRD of thin films manufactured using $Ar+N_2+CO_2$ (a) and $Ar+N_2+CO$ (b) as reaction gases.

As shown in FIG. 1, when $N_2+CO_2$ (a) and $N_2+CO$ (b) were used as reaction gases, O was not sufficiently substituted with C or N so that it could change the crystalline phase. Accordingly, anatase phase was mostly formed and peaks that were related to TiC or TiN crystallization property was not observed.

In FIG. 2, it could be confirmed that by using Ar, an inert gas, the overall peak intensity was higher, and when $N_2+CO_2$ was used as reaction gas, rutile phase, which was not previously seen, was observed. In addition, when $Ar+N_2+CO$ was used as reaction gas, anatase phase was generally established and the intensities of peaks other than the main peak was observed to be higher than when $Ar+N_2+CO_2$ was used a reaction gas. When Ar was used as a sputter gas These phenomenon occurs when Ar gas is used as a sputter gas, more Ti particles are sputtered from the target due to Ar, and thus, reaction between $N_2$, CO gas and Ti is more easily occurred because of high active energy of the surface of the plates is achieved due to mean free path. Ti particles that have a high active energy have a high surface shifting degree, and therefore, crystallized particles can be more easily formed. Consequently, the crystallization of thin films that were deposited with the assistance of Ar gas forms more perfect anatase crystallization phase than that of other thin films, thereby increasing the photocatalytic activities. Compared to the following explanation of the measurement results of contact angle, the reason for the contact angle of $Ar+N_2+CO$ or $N_2+CO$ being remarkably lower than that of $Ar+N_2+CO_2$ or $N_2+CO_2$ is the same as explained above. As a result, it is preferable to use Ar as a sputter gas and to use CO than $CO_2$ as a reaction gas.

Based on these results, the effect of concentrations of $N_2$ and CO that uses $Ar+N_2+CO$ as a reaction gas on photocatalysts is explained below.

Figure 3:
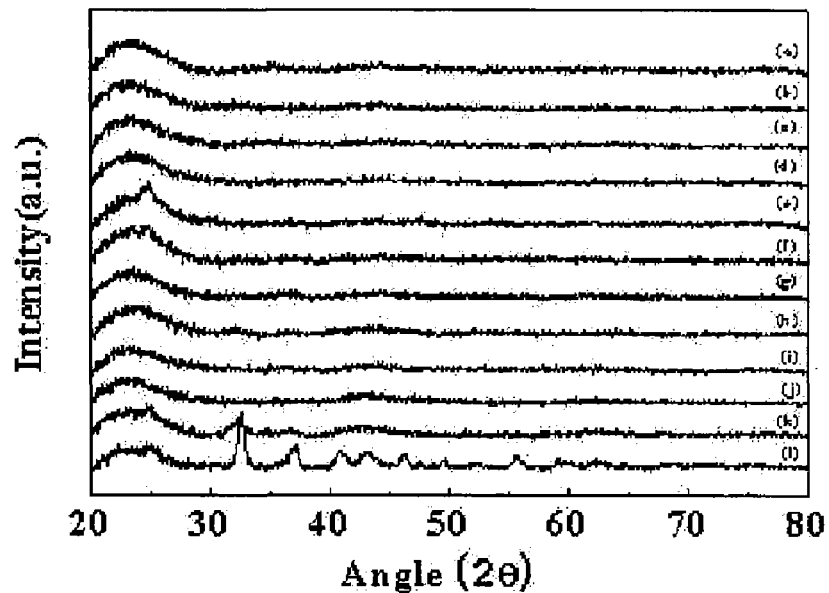
FIG. 3 is a graph of XRD of thin films before heat treatment which were manufactured on glass by using Ar+CO (a), $Ar+N_2+CO$ (b~k) and $Ar+N_2$ (l) as reaction gases and sputtering Ti metal target.
Figure 4:
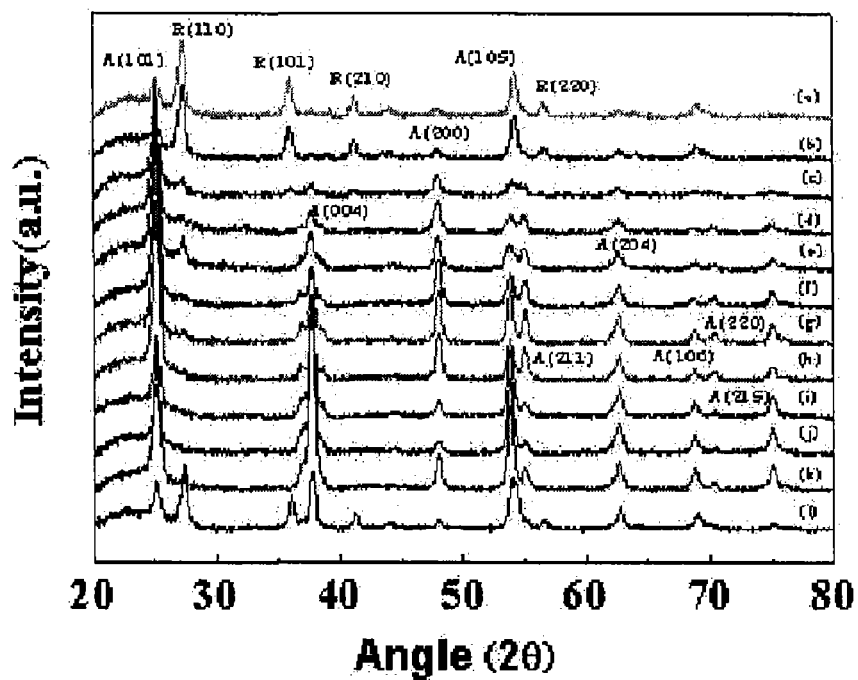
FIG. 4 is a graph of XRD of each thin films of FIG. 3 after heat treatment at 500° C. for 4 hours.
Figure 5:
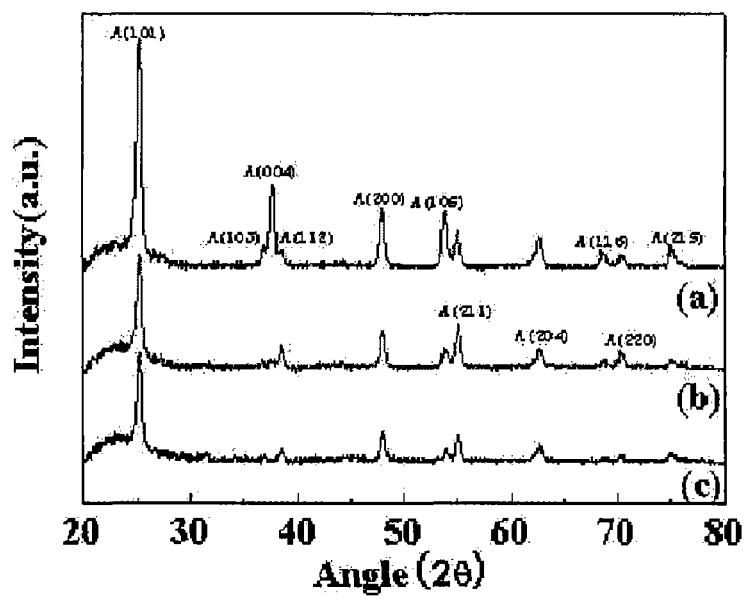
FIG. 5 is a graph of XRD after heat treating thin films, which were manufactured on glass by using $Ar+N_2+CO$(a), $Ar+N_2+O_2$(b) and $Ar+O_2$(c) as reaction gases, followed by sputtering Ti metal target, and heat treating at 500° C. for 4 hours.

FIG. 3 shows a graph of XRD of thin films before heat treatment which was manufactured using Ar+CO (a), $Ar+N_2+CO$ (b~k) and $Ar+N_2$ (l) as reaction gases, and FIG. 4 and FIG. 5 are XRD graphs of thin films after heat treatment at 500° C. for 4 hours.

Table 2 represents gas flow ratios of $N_2$:CO when the reaction gases (a) to (l) illustrated in FIG. 3 and FIG. 4 and $Ar+N_2+CO$ (b~k) are used.

TABLE 2

| | Reaction gas | $N_2$:CO |
|---|---|---|
| a | Ar + CO | — |
| b | Ar + $N_2$ + CO | 1:10 |
| c | Ar + $N_2$ + CO | 2:9 |
| d | Ar + $N_2$ + CO | 3:8 |
| e | Ar + $N_2$ + CO | 4:7 |
| f | Ar + $N_2$ + CO | 5:6 |
| g | Ar + $N_2$ + CO | 6:5 |
| h | Ar + $N_2$ + CO | 7:4 |
| i | Ar + $N_2$ + CO | 8:3 |
| j | Ar + $N_2$ + CO | 9:2 |
| k | Ar + $N_2$ + CO | 10:1 |
| l | Ar + $N_2$ | — |

As shown in FIG. 3 and FIG. 4, before heat treatment, the oxygen site existed as amorphous thin film of $TiN_xC_yO_z$ with N and C, but after heat treatment at 500° C., since the radii of C and N oxygen are smaller than oxygen, due to lattice movement, crystalline $TiN_xC_yO_z$ is formed. The remaining N and C exists $TiO_{2-X-\delta}C_XN_\delta$ thin films wherein a small amount as unobserved by peak substituted the O site. In conclusion, after the heat treatment of the $TiO_{2-X-\delta}C_XN_\delta$ thin films, existence of a small amount of N and C was confirmed.

According to FIG. 4, the intensity of A(105) and A(200) could be clearly observed with participation of reactive sputter gases of $N_2$ and CO, and it could be confirmed that the intensity of A(200), which is known to have an effective photocatalytic activities A(200) clearly increased. When the heat treatment temperature was 500° C., formation of anatase phase was most clearly shown and the intensity was shown to be high. Accordingly, photocatalytic activities thereof were also shown to be high. The thin films of $TiO_{2-X-\delta}C_XN_\delta$ according to the present invention that were heat treated at 500° C. was shown to have clear A(105) and A(211) peaks, which are shown to be weakly observed in other thin films. Therefore, it is expected to have an effective photocatalytic activities. In terms of the proportions of CO and $N_2$, A(211) peak of was increased until the proportion of CO: $N_2$ is 5:6. However, as the amount of CO increased, A (105) and A(211) peaks were combined and A(211) disappeared and was combined into A(105) when the proportion of CO:$N_2$ was 10:1. The intensity of A(220) was also gradually reducing until the proportion of CO:$N_2$ became 6:5 and it completely disappeared when the proportion of CO:$N_2$ was 9:2. Rutile peak was confirmed when the proportion of the amount of CO:$N_2$ was about 7:4. In conclusion, it was confirmed that pure anatase phase was formed when the proportion of CO:$N_2$ is within the range of about 1:10 to 6:5.

It is considered that when CO is used as a reaction gas, kinetic energy from Ti ion which was released from the target was increased, thereby forming more stable rutile phase. In general, rutile phase can absorb more light than anatase phase at a wavelength range of closer to the visible light (for your reference, the energy bandgap of rutile phase is 3.02 eV, while that of anatase phase is 3.2 eV.) and has a thermally stable structure, and therefore, it is suitable to be used as a photocatalyst. However, photocatalysts of anatase phase have stronger photocatalytic activities in reality. Such a result is due to the difference of location between the reduction potentials of rutile phase and anatase phase. In other words, the reduction potential of rutile phase is located near the reduction potential of hydrogen, that of anatase phase is located further to the negative side. Since its reduction is more efficient, it is expected to be shown to have an increased photocatalytic activities. As a result, due to the pure anatase phase formation explained by A(105) and A (211) peaks with the production of A(220) peak, it is recognized that the photocatalytic activities have increased. XRD of the N-doped $TiO_{2-x-\delta}C_xN_\delta$ and pure $TiO_2$ thin films were observed in support of the above.

Figure 14:
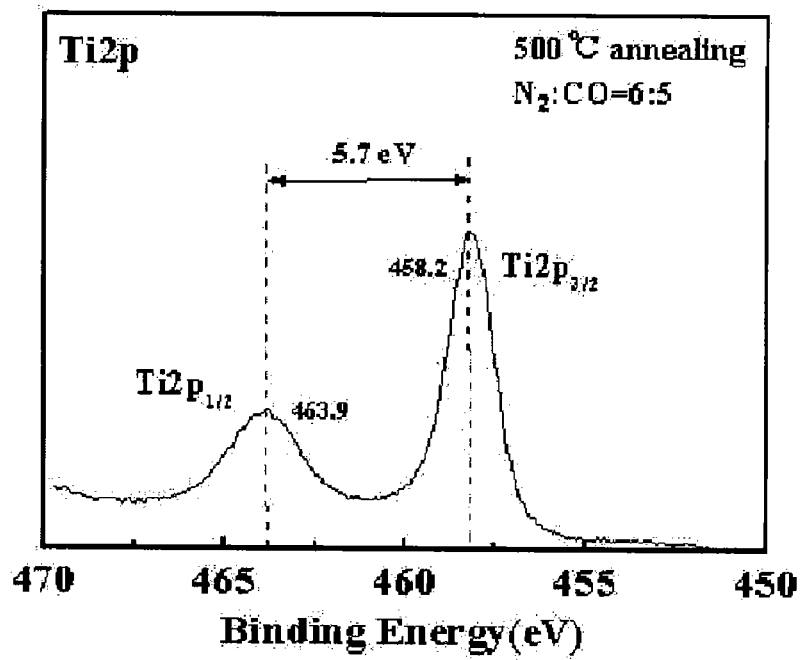
FIG. 14 shows Ti2p core level spectrum of the thin films of $TiO_{2-X-\delta}C_XN_\delta$ according to the present invention after heat treatment.

FIG. 5 and FIG. 14, if not mentioned otherwise, illustrate the results of the property examination of the $TiO_{2-x-\delta}C_xN_\delta$ thin film that were deposited by flowing $Ar+N_2+CO$ at a flow rate of 15 sccm, 18 sccm, and 15 sccm, respectively (i.e., ratio of $N_2:CO=6:5$) and maintaining the degree of vacuum at 10 mTorr, followed by heat treating at 500° C.

FIG. 5 is a graph of XRD observed after heat treating thin films, which were manufactured on glass using $Ar+N_2+CO$ (a), $Ar+N_2+O_2$(b) and $Ar+O_2$(c) as reaction gases, followed by sputtering Ti metal target, at 500° C. for 4 hours. Even though all of the thin films formed anatase phase, as can be shown in the intensity differences between each thin film peaks, thin films that were prepared by $Ar+N_2+CO$ more clearly achieved anatase phase than others. As a result, the thin films that were prepared by $Ar+N_2+CO$ showed excellent effects from the results of contact angle test and test for decomposition of methylene blue.

Figure 6:
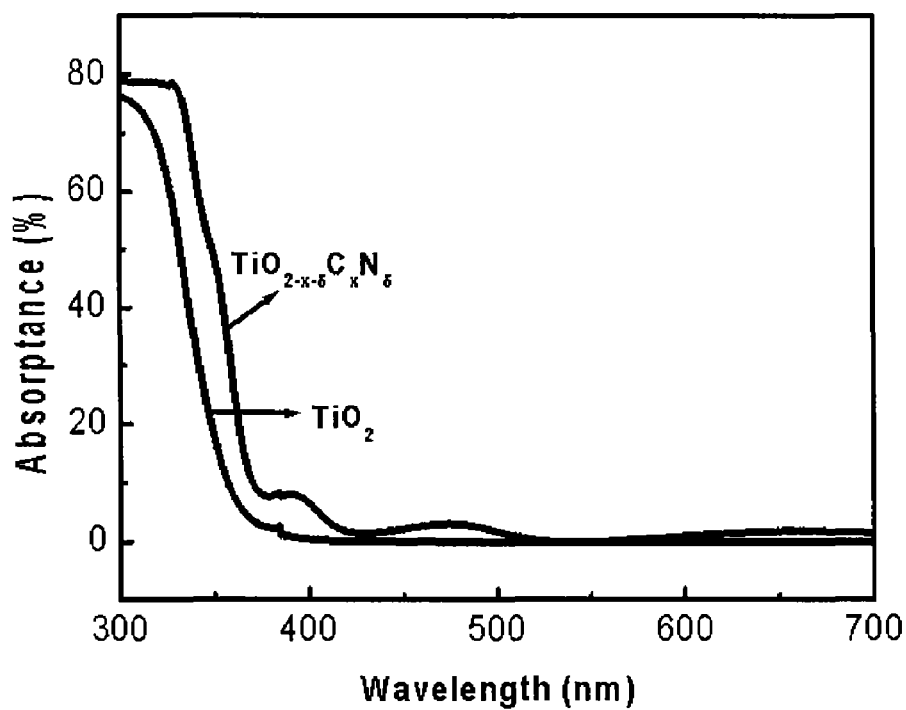
FIG. 6 illustrates the absorption spectrums of thin films of $TiO_{2-X-\delta}C_XN_\delta$ of the present invention and thin films of pure $TiO_2$ of conventional art.
Figure 7:
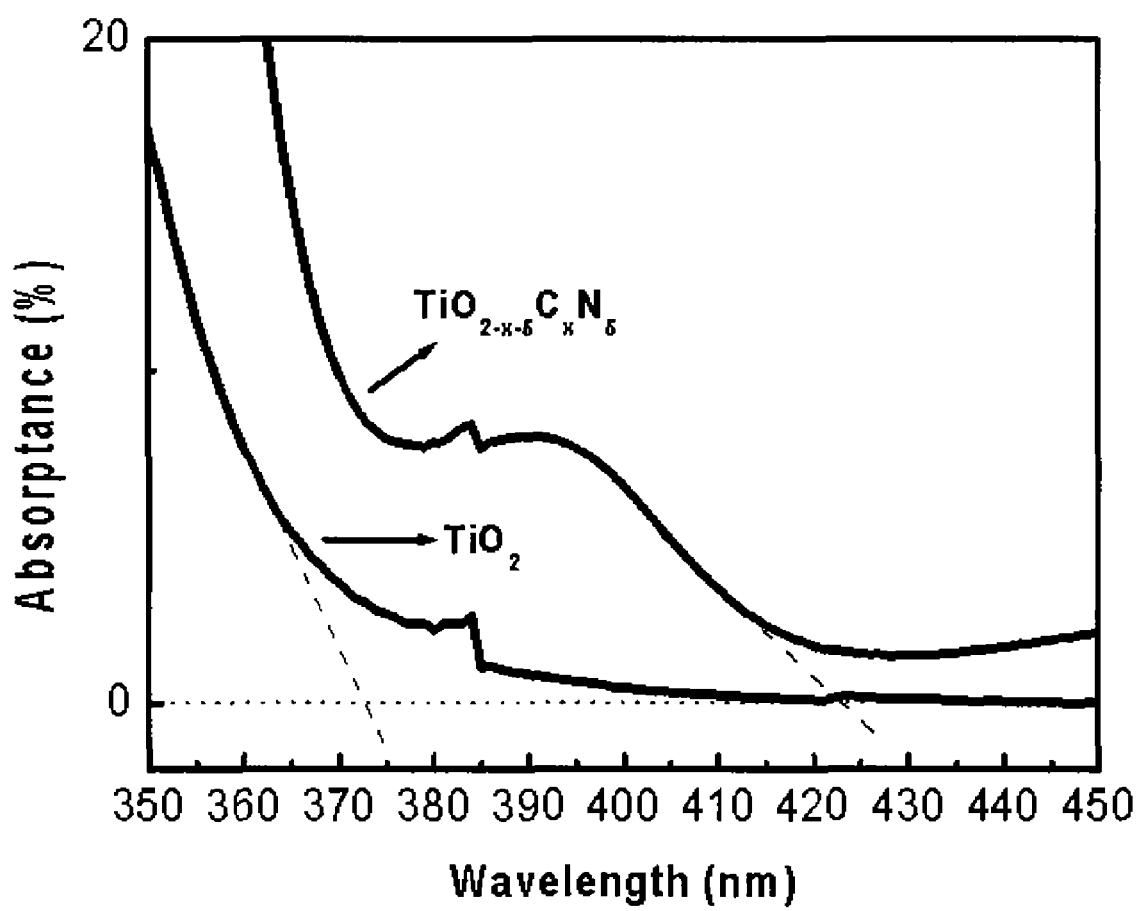
FIG. 7 illustrates a magnified view of the absorption edge part of the spectrum illustrated in FIG. 6.

FIG. 6 illustrates comparison of the absorption spectra of thin films of $TiO_{2-x-\delta}C_xN_\delta$ and thin films of pure $TiO_2$, and FIG. 7 illustrates magnified view of the absorption edge part of the spectrum illustrated in FIG. 6.

As shown in FIG. 6, although a pure anatase $TiO_2$ is generally known to have a bandgap of 377 nm, the bandgap is shown as 385 nm, thereby indicating an error of 8 nm. According to the magnified view of the absorption edge in FIG. 7, it is shown that the absorption edge of the thin film of $TiO_{2-x\delta}C_xN_\delta$ has moved more toward visible light range compared to that of the pure $TiO_2$ thin film. As a result of measurement, the absorption edge of the thin films of $Ti_{2-x-\delta}C_xN_\delta$ has moved to wavelength range of 425 nm, and when its energy bandgap of 2.9 eV is obtained by using the formula $\lambda$ (nm)=1240/Eg, indicating a 10% move towards visible light range.

As explained above, since pure $TiO_2$ has high bandgap energy, its photocatalytic activity cannot be exhibited under visible light. However, such change in bandgap is shown in the thin films of $TiO_{2-x-\delta}C_xN_\delta$ according to the present invention that allows them to absorb visible light, thereby exhibiting photocatalytic activities. The main reason is believed to be due to the reduction in bandgap between conduction band and valence band caused by impurity energy level formed due to the substitution of O with N and C, thereby causing crystalline improvement and increase in the surface area ratio of the photocatalysts.

Next, fine structure of the surface of the photocatalysts, which have a close relationship with the photocatalytic activities, was observed and the results thereof are explained below.

Figure 8:
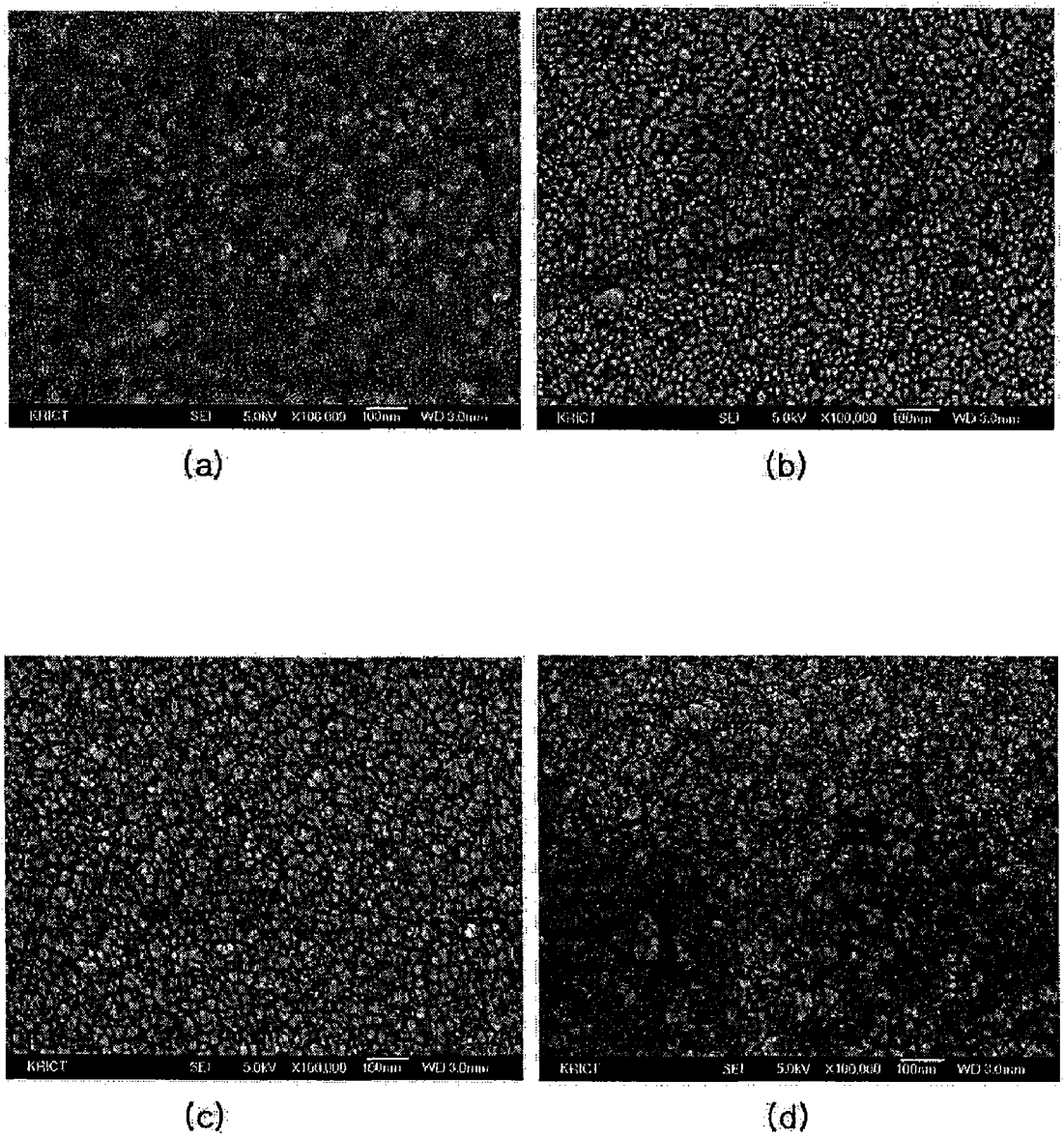
FIG. 8 shows FE-SEM (magnification: ×100,000) photographs of thin films before heat treatment that were manufactured on glass by using (a) $Ar+N_2+CO$, (b) $Ar+O_2$, (c) Ar+CO, and (d) $Ar+N_2$ as reaction gases and sputtering Ti metal target.
Figure 9:
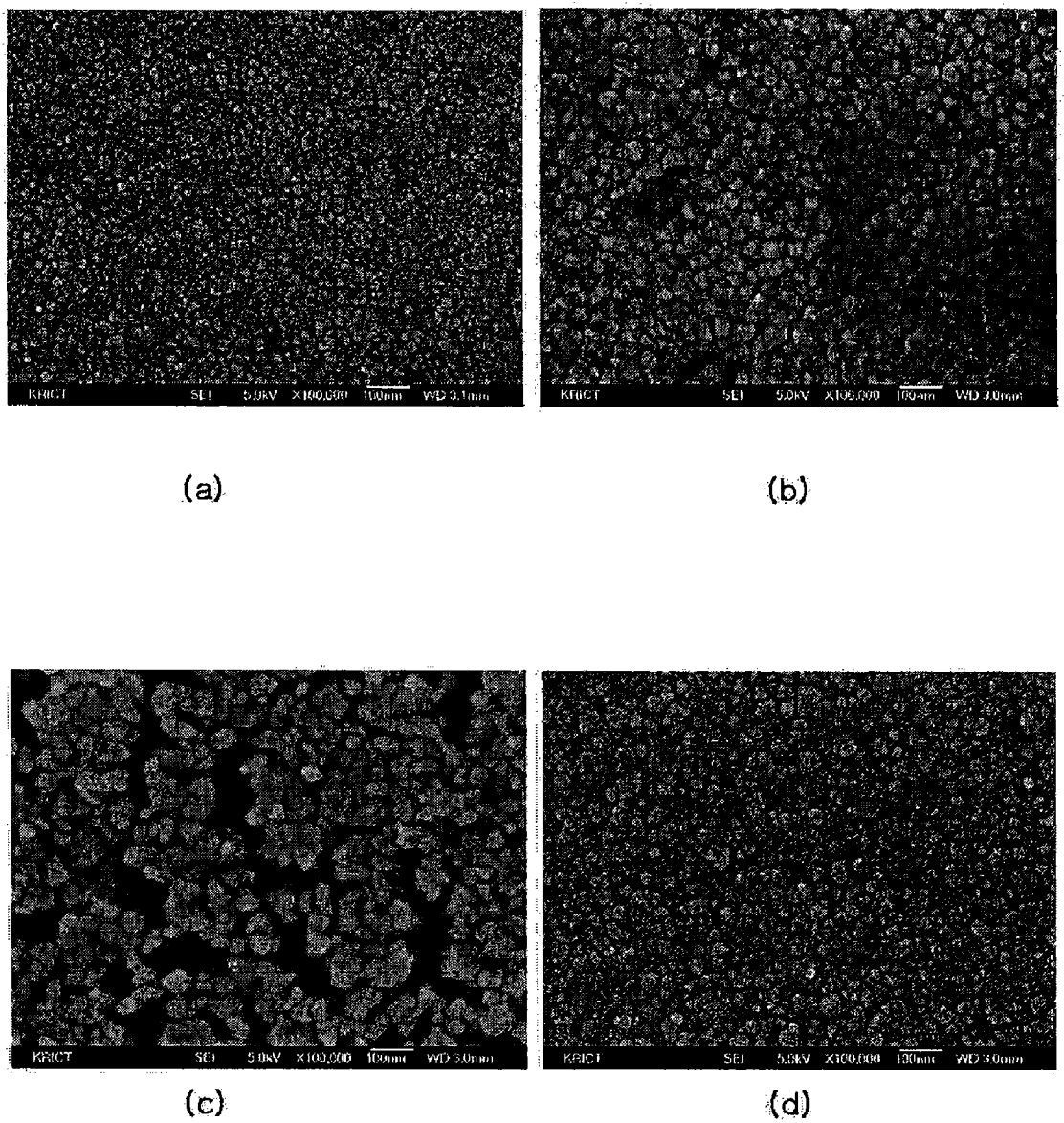
FIG. 9 shows FE-SEM (magnification: ×100,000) photographs of thin films of (a), (b), (c) and (d) of FIG. 8 after heat treatment.

FIG. 8 shows FE-SEM (magnification: ×100,000) photographs of thin films before heat treatment each deposited by using (a) $Ar+N_2+CO$, (b) $Ar+O_2$, (c) $Ar+CO$, and (d) $Ar+N_2$ as reaction gases, respectively. Additionally, FIG. 9 shows FE-SEM (magnification: ×100,000) photographs of the thin films of (a), (b), (c) and (d), respectively, after heat treatment.

It can be shown that the particles were grown after heat treatment, similarly to a general ceramic heat treatment. It has been reported that the temperature of heat treatment and the particle size have significant effect in photocatalytic activities. By heat treatment, amorphous phase becomes anatase phase, and the crystalline of the particles improves. When heat treated at a temperature 800° C. or more, at which rutile phase is formed, the particle size increases and the surface area is reduced, and therefore, the photocatalytic activities are decreased. Moreover, as the temperature becomes higher, the thin films become opaque and transmittance is decreased. It was confirmed that when thin films of the present invention which was deposited using $Ar+N_2+CO$ and was heat treated at 500° C. had a grain size of about 30 nm, which is smaller than those using other reaction gases (for reference, thin films that are deposited with $Ar+O_2$ have a grain size (thickness) of 50 nm, and those with $Ar+N_2$ is of 40 nm). As a result, thin films that are deposited using $Ar+N_2+CO$ and are heat treated at about 500° C. were shown to have the best photocatalytic activities. In general, since the photocatalyst reduction reaction occurs on the surface of the photocatalysts, it has been reported that as the particle size is reduced, the ratio surface area is therefore increased, and thus, the photocatalytic activities can be easily occurred (D. H. Kim, Environ. Sci. Technol., 28, 479, 1994), and the results of the present invention also concur with the report.

Next, the composition of the thin films of $TiO_{2-x-\delta}C_xN_\delta$ according to the present invention was measured using XPS after heat treating at 500° C. and the analysis thereof is explained below.

Figure 10:
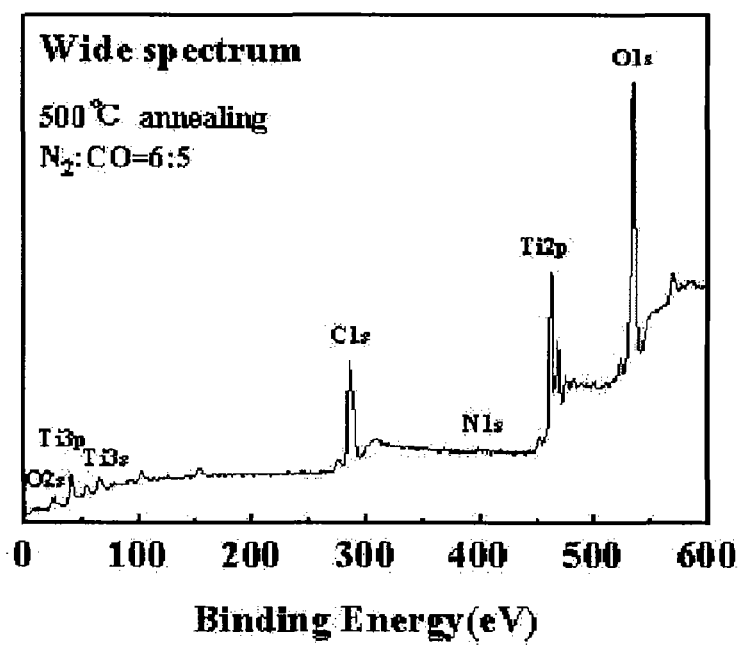
FIG. 10 shows XPS broad spectrum of the thin films of $TiO_{2-X-\delta}C_XN_\delta$ according to the present invention.

FIG. 10 shows XPS wide spectrum of the thin films of $TiO_{2-x-\delta}C_xN_\delta$ according to the present invention after heat treatment. As a result of its analysis, only Ti, N, C, O peaks, not other peaks such as Na, K, could be observed.

Figure 11:
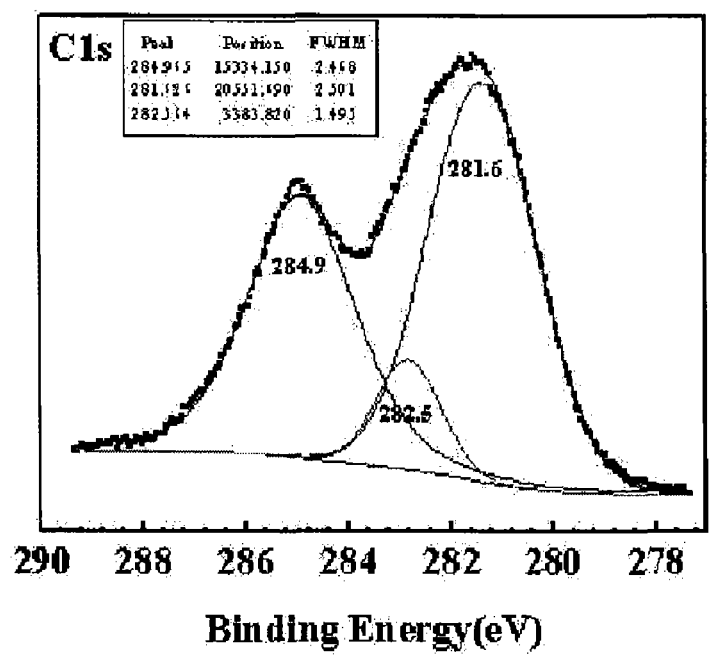
FIG. 11 shows C1s core level spectrum of the thin films of $TiO_{2-X-\delta}C_XN_\delta$ according to the present invention after heat treatment.

FIG. 11 shows C1s core level spectrum of the thin films of $TiO_{2-x-\delta}C_xN_\delta$ according to the present invention after the heat treating process (2). The peak at 284.9 eV is a peak that was obtained by foreign contaminants or from the oil used for Diffusion pump for the XPS system. According to G. Li reference (G. Li, L, F, Xia, Thin Solid Films, 396, 16-22, 2001), a peak at 281.6 eV represents TiC and a peak at 282.5 eV represents interstitial carbon. In FIG. 11, peaks at 281.6 eV and 282.5 eV were observed. The existence of those peaks may be due to the fact that the radius of carbon ion, which is 1.15 Å, is smaller than the radius of oxygen ion, which is 1.40 Å, thereby allowing lattice substitution of C towards O site, and thus, not only TiC is produced, but also interstitial carbon may be produced.

Figure 12:
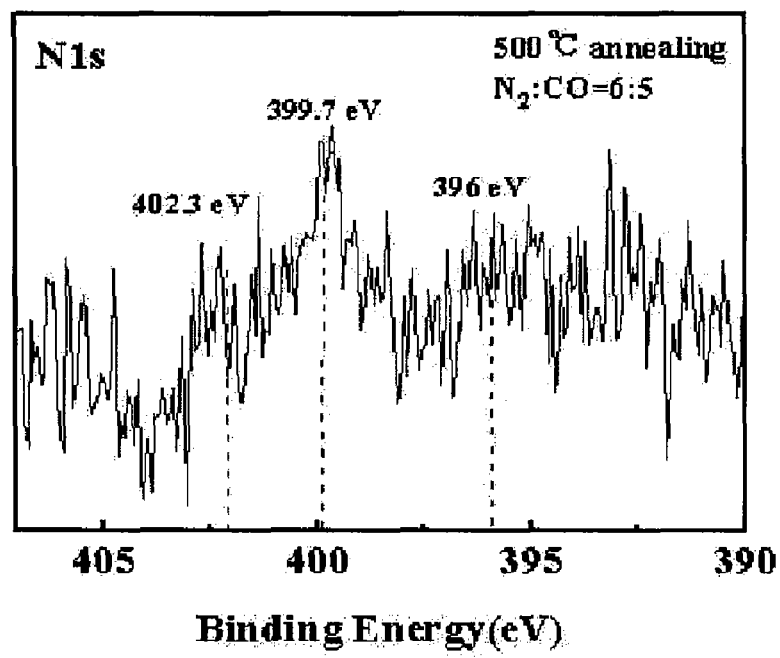
FIG. 12 shows N1s core level spectrum of the thin films of $TiO_{2-X-\delta}C_XN_\delta$ according to the present invention after heat treatment.

FIG. 12 shows N1s spectrum of the thin films of $TiO_{2-x-\delta}C_xN_\delta$ according to the present invention after the heat treating process (2). According to Zhao et al., (Q. N. Zhao, C. L. Li, X. He and X. J. Zhao, Key Engineering Materials, 29. 457-462, 2003), nitrogen peaks of thin films of N-doped $TiO_{2-x}N_x$ consists of 3 types of peak, 396.0±0.2 eV, 399.9±0.2 eV, 402.0±0.4 eV, and the peak at 396.0±0.2 eV is Ti—N peak. The peak at 396.0±0.2 eV improves the photocatalytic activities because the valence band of N2p level, which higher than the valence band of O2p before the N-doping, is formed due to the N-doping valence band. Furthermore, TiC peak of 281.6 eV was observed due to C-doping, and the C-doping also reduced energy bandgap, and therefore, it is also expected to improve visible light absorption.

Figure 13:
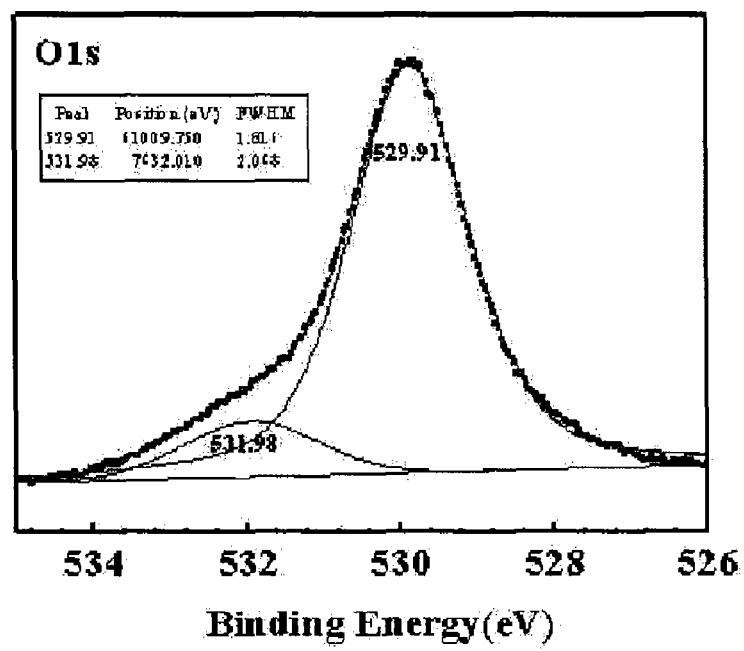
FIG. 13 shows O1s core level spectrum of the thin films of $TiO_{2-X-\delta}C_XN_\delta$ according to the present invention after heat treatment.

FIG. 13 shows O1s spectrum of the thin films of $TiO_{2-X-\delta}C_XN_\delta$ according to the present invention after the heat treating process (2). A peak at 529.7±0.2 eV represents Ti—O bond of $TiO_2$, and a peak at 531.9±0.2 eV represents C=O bond related to hydroxyl (OH) species. Peaks near 529.91 eV and 531.98 eV were also eminent, and thus, they were separated similarly to C1s. Most of the peaks were at 529.91 eV which represents Ti—O bond, and a small amount of peaks existed at 531.98 eV.

FIG. 14 shows Ti2p spectrum of the thin films of $TiO_{2-X-\delta}C_XN_\delta$ according to the present invention after the heat treating process (2). $Ti2p_{3/2}$ peak was observed at 458.2 eV, and $Ti2p_{1/2}$ peak was observed at 463.9 eV, which is 5.7 eV away. Such result is consistent with the standard peak value of $TiO_2$ (J. F. Moulder, W. F. Stickle, F. E. Sobol, K. D. Bomben, in: J. Chastain, R. C. King (Eds), Handbook of X-ray Photoelectron Spectroscopy, Physical Electronics Inc., Eden Prairie, Minn., 1995), and furthermore, even if the reaction gas is doped, Ti site has no effect, which is a characteristic of the thin films of $TiO_{2-X-\delta}C_XN_\delta$ as that exists having a valence of $Ti^{4+}$.

EXAMPLE 1

Reduction of Methylene Blue by the Thin Films of $TiO_{2-X-\delta}C_XN_\delta$ and $TiO_2$ One of the most common ways to determine decomposition of organic materials by a photocatalyst is to use methylene blue (hereinafter, referred to as "MB") decomposition reaction test. The chemical formula of MB is $C_{16}H_{18}N_3SCl.3H_2O$, and MB is often used when measuring a photocatalyst's capability to decompose organic materials.

Figure 16:
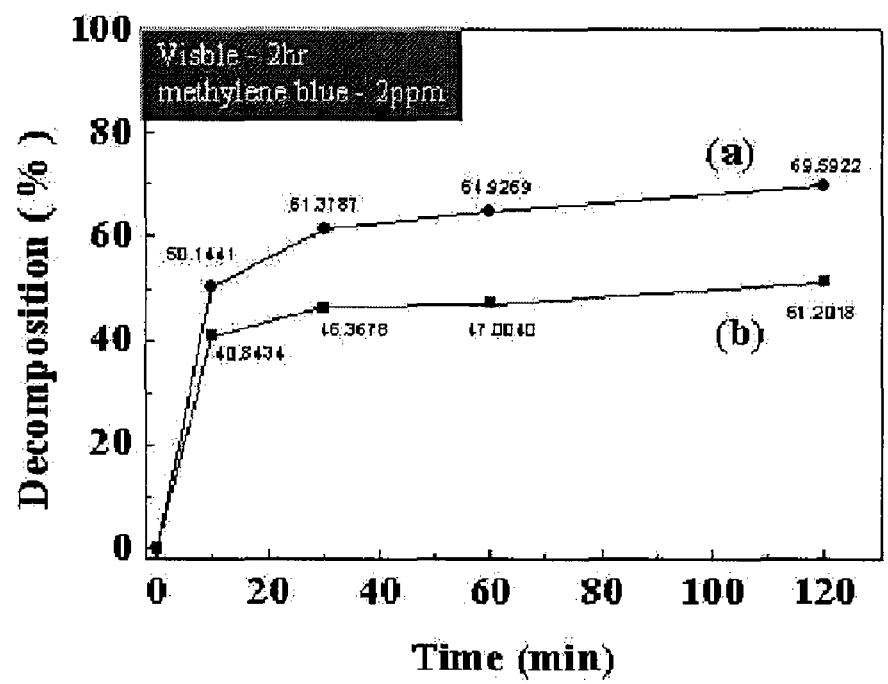
FIG. 16 a graph illustrating (a) methylene blue decomposing capabilities of thin films of $TiO_{2-X-\delta}C_XN_\delta$ and (b) methylene blue decomposing capabilities of thin films of $TiO_2$ under visible light.

The doping ratio of C and N or that of CO and $N_2$ used when preparing the thin films in FIG. 5 and FIG. 16 was $N_2:CO=6.5$, and the thin films were flowed with $Ar+N_2+CO$ at a flow rate of 15 sccm, 18 sccm, and 15 sccm, respectively, and the vacuum degree was maintained at 10 mTorr. Samples with C and N doping concentration of x=0.15, δ=0.005 were used.

Figure 15:
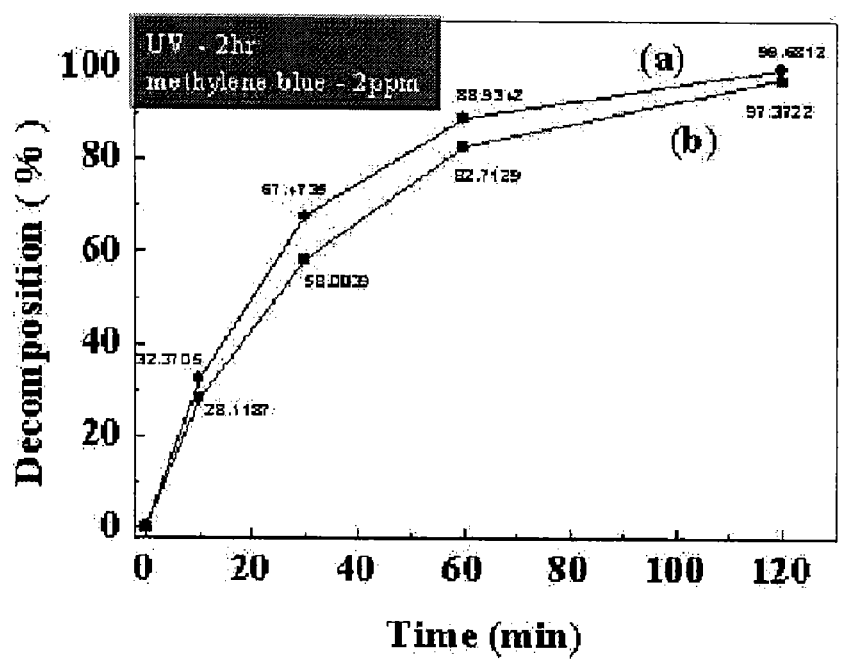
FIG. 15 is a graph illustrating (a) methylene blue decomposing capabilities of thin films of $TiO_{2-X-\delta}C_XN_\delta$ and (b) methylene blue decomposing capabilities of thin films of $TiO_2$ under ultraviolet ray.

FIG. 15 is a graph illustrating (a) MB decomposing capabilities of thin films of $TiO_{2-X-\delta}C_XN_\delta$ and (b) MB decomposing capabilities of thin films of $TiO_2$ according to time evolution when MB having a concentration of 2 ppm was irradiated with ultraviolet rays. The decomposed amount was measured using UV-Visibit Spectroscope by the correction of the absorption amount at 665 nm. As shown in FIG. 15, as the decomposing time evolves, MB is decomposed, but particularly after 2 hours has passed, the decomposed portions of the thin films of $TiO_{2-X-\delta}C_XN_\delta$ was 99%, while those of $TiO_2$ was 97%. These results were within the normal degrading efficiency and consistent with the results from the contact angle measurements.

FIG. 16 is a graph illustrating the results of test under the same conditions used for irradiating the ultraviolet ray except that for this time a 100 W florescent lamp attached with a UV blocking was used for light, thereby allowing only visible light to pass through. Similarly, as the decomposing time passes, MB was decomposed, but particularly after 2 hours have passed, the decomposed portions of the thin films of $TiO_{2-X-\delta}C_XN_\delta$ was 51%, while those of $TiO_2$ was 70%. In theory, pure $TiO_2$ was expected to have a decomposed portion near 0, however, due to a small portion of ultraviolet ray that might have passed the UV blocking filter and the weak properties of MB under UV and light are recognized to cause the decomposed portions to be about 50%.

EXAMPLE 2

Measurement of Changes to Contact Angles of Thin Films of $TiO_{2-X-\delta}C_XN_\delta$ and thin films of $TiO_2$ (Confirmation of Self-cleaning Effect)

In general, in order to measure the hydrophilic property of a thin film, a water drop is dropped on the surface of the thin film and contact angle of the water drop to the surface of the thin film is measured. In Example 2, in order to determine the property of the photocatalysts of $TiO_{2-X-\delta}C_XN_\delta$ thin films under visible light, changes to contact angles of the thin films were measured after irradiating ultraviolet rays and visible light.

Figure 17:
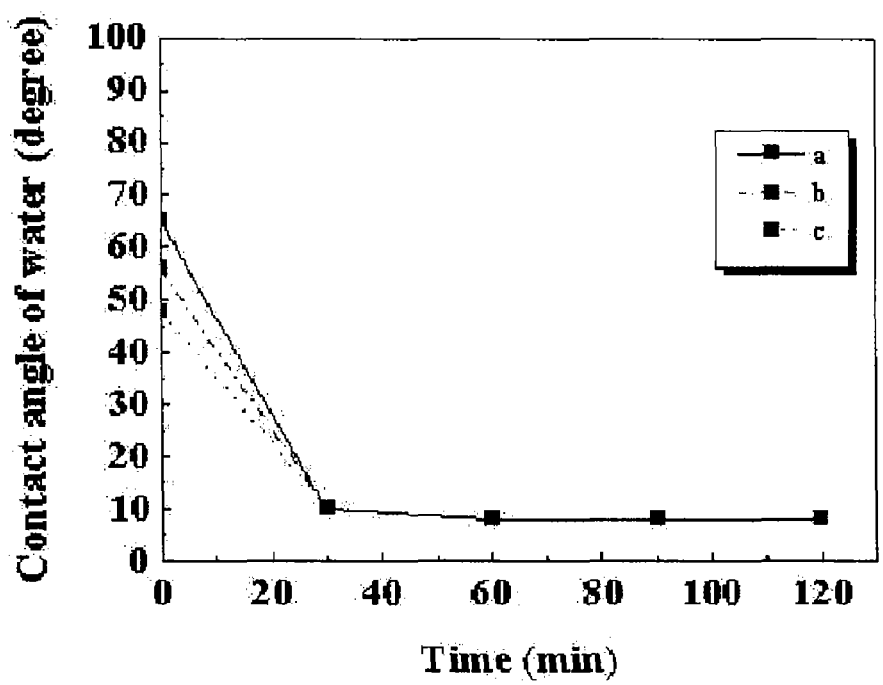
FIG. 17 is a graph illustrating the changes to contact angles of the thin films that were prepared by using $Ar+O_2$ (a), $Ar+N_2+CO_2$ (b) and $Ar+N_2+CO$ (c) as reaction gases, heat treating followed by irradiating ultraviolet ray.

FIG. 17 is a graph illustrating the changes to contact angles of the thin films that were prepared using $Ar+O_2$ (a), $Ar+N_2+CO_2$ (b) and $Ar+N_2+CO$ (c) as reaction gases, then were heat treated at 500° C., followed by irradiation of UV lamp of 6 W having a wavelength of 254 nm. FIG. 17 shows that after 30 minutes of UV irradiation, contact angle of all of the thin films has decreased to be less than 10°. The surface of $TiO_2$ under the normal condition is hydrophobic because of stability caused by the bridge role of oxygen (bridge oxygen) between Ti and Ti. When the surface is irradiated with UV ray, a part of the bridge oxygen gets dislocated, thereby forming oxygen deficiency, and by dissociation/adsorption of water molecules to the oxygen deficiency, chemically absorbing water (surface hydroxyl) is produced, and thus the surface become hydrophilic and the contact angle also changes.

Figure 18:
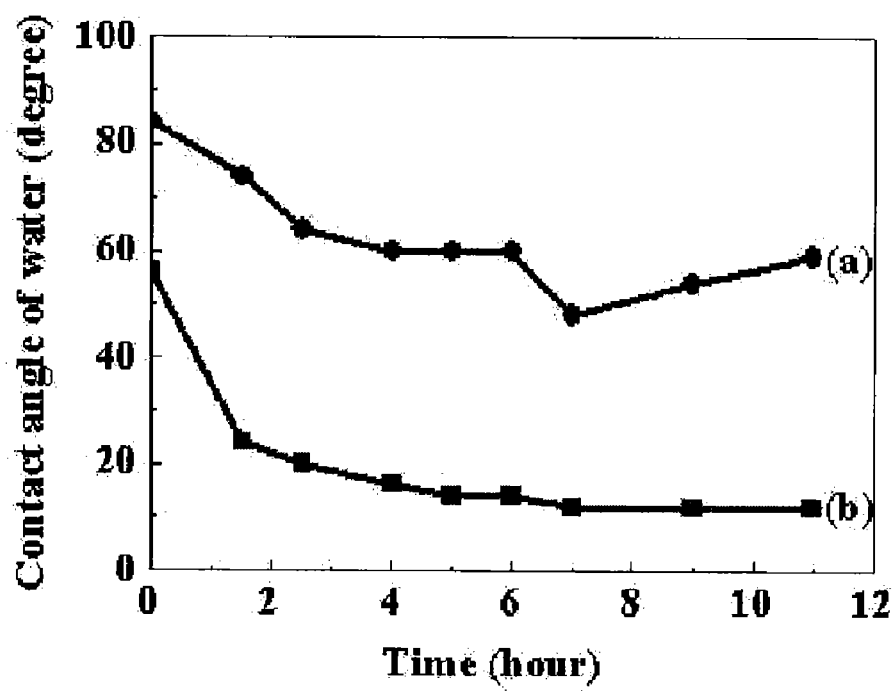
FIG. 18 is a graph illustrating the changes to contact angles of the thin films that were prepared by using $N_2+CO_2$ (a) and $N_2+CO$ (b) as reaction gases, heat treating followed by irradiating visible light.
Figure 19:
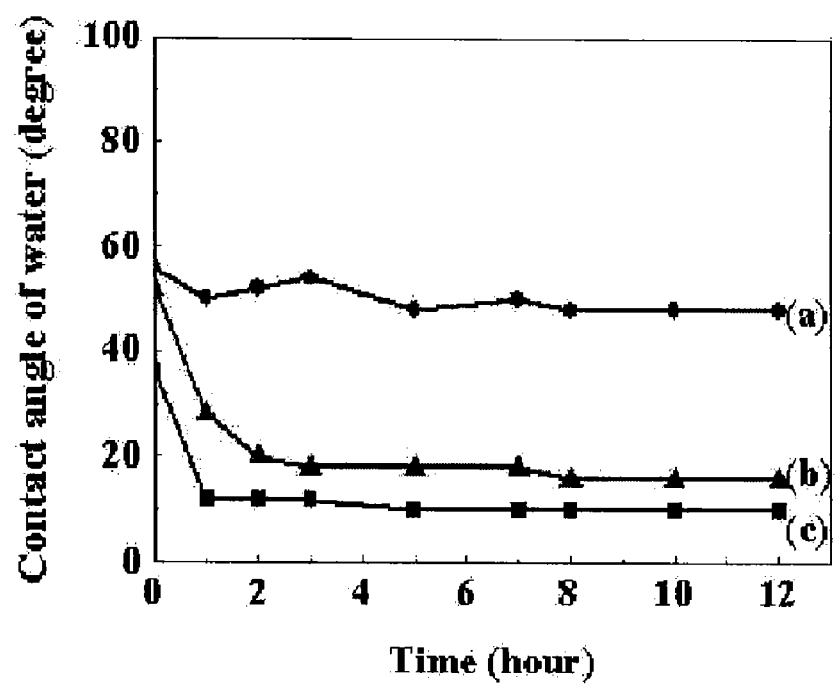
FIG. 19 is a graph illustrating the changes to contact angles of the thin films that were prepared by using $Ar+O_2$ (a), $Ar+N_2+CO_2$ (b) and $Ar+N_2+CO$ (c) as reaction gases, heat treating followed by irradiating visible light.

FIG. 18 is a graph illustrating changes in contact angles of the thin films that were prepared by using $N_2+CO_2$ (a) and $N_2+CO$ (b) as reaction gases and heat treating at 500° C., followed by irradiating visible light using 300 W metal halide lamp blocked with UV according to irradiating time. When $N_2+CO$ was used as reaction gas in (b), the contact angles changes were similar to those irradiated by UV, that is the contact angles were lowered near 10°. However, when $N_2+CO_2$ was used as reaction gas in (a), there were no noticeable changes in contact angles. It was confirmed that when CO is used as a reaction gas, the contact angle much lower than when $CO_2$ was used. Moreover, it was also confirmed that the photocatalysts were activated under the visible light, thus obtaining hydrophilicity. FIG. 19 is a graph illustrating contact angles of the thin films prepared using $Ar+O_2$ (a), $Ar+N_2+CO_2$ (b) and $Ar+N_2+CO$ (c) as reaction gases, which exhibit more clear anatase peaks reaction gases. The contact angle of pure $TiO_2$ (a) prepared using $Ar+O_2$ as reaction gas was not decreased because the pure $TiO_2$ cannot absorb visible light rays. Compared to FIG. 18, the contact angle was even more lowered at the visible light range, and it may be due to the intensity of anatase phase. As can be seen from the results, the reason that the contact angles are lowered under the visible light compared to the pure $TiO_2$ is due to a small amount of C and N that substitutes the O site, thereby forming impurity level, and such impurity level causes energy bandgap to be smaller than that of the pure $TiO_2$, and therefore, it may be determined that hydrophilic property can be exhibited at the visible light range.

Figure 20:
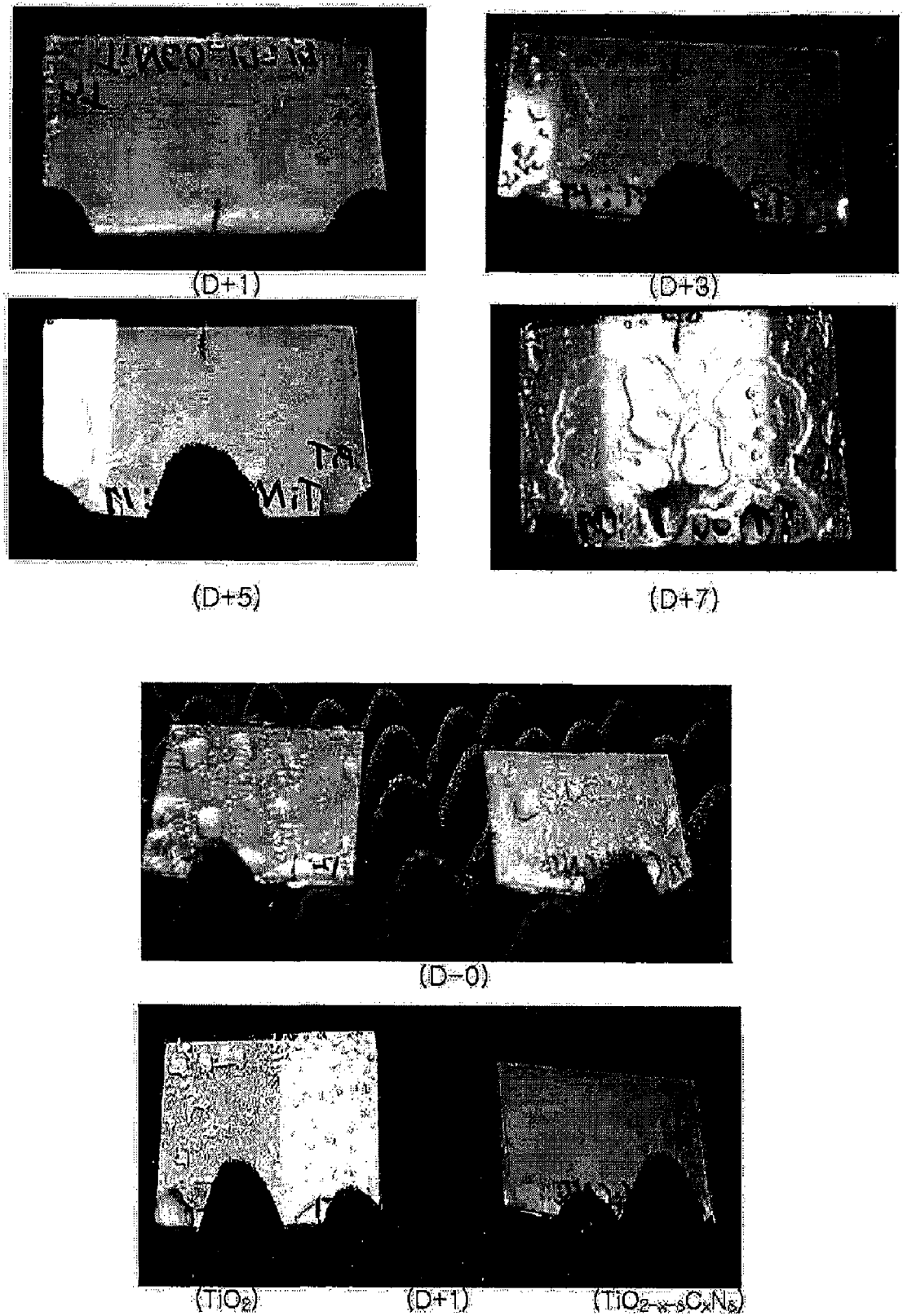
FIG. 20 depicts six photographs of degrading characteristics to visible light rays of $TiO_{2-X-\delta}C_XN_\delta$ thin films of the present invention according to passage of time.

FIG. 20 shows photographs of degrading characteristics to visible light rays of $TiO_{2-X-\delta}C_XN_\delta$ thin films of the present invention according to passage of time. When the thin films were placed in a dark room with the conventional $TiO_2$, the contact angles were restored to high contact angle in two days, thereby exhibiting degradation reaction. However, in the case of $TiO_{2-X-\delta}C_XN_\delta$, it took 7 more days until the degradation reaction could be observed. Therefore, it could be determined that the degradation progressed very slowly. Furthermore, when two thin films that were degraded were exposed under minimal florescent lamp ultraviolet rays in a room to determine the extent of recovery, the results showed that in the case of $TiO_2$, the contact angles continuously could not be recovered, however, the contact angles of $TiO_{2-X-\delta}C_XN_\delta$ could be recovered even after 1 day of irradiation.

Figure 21:
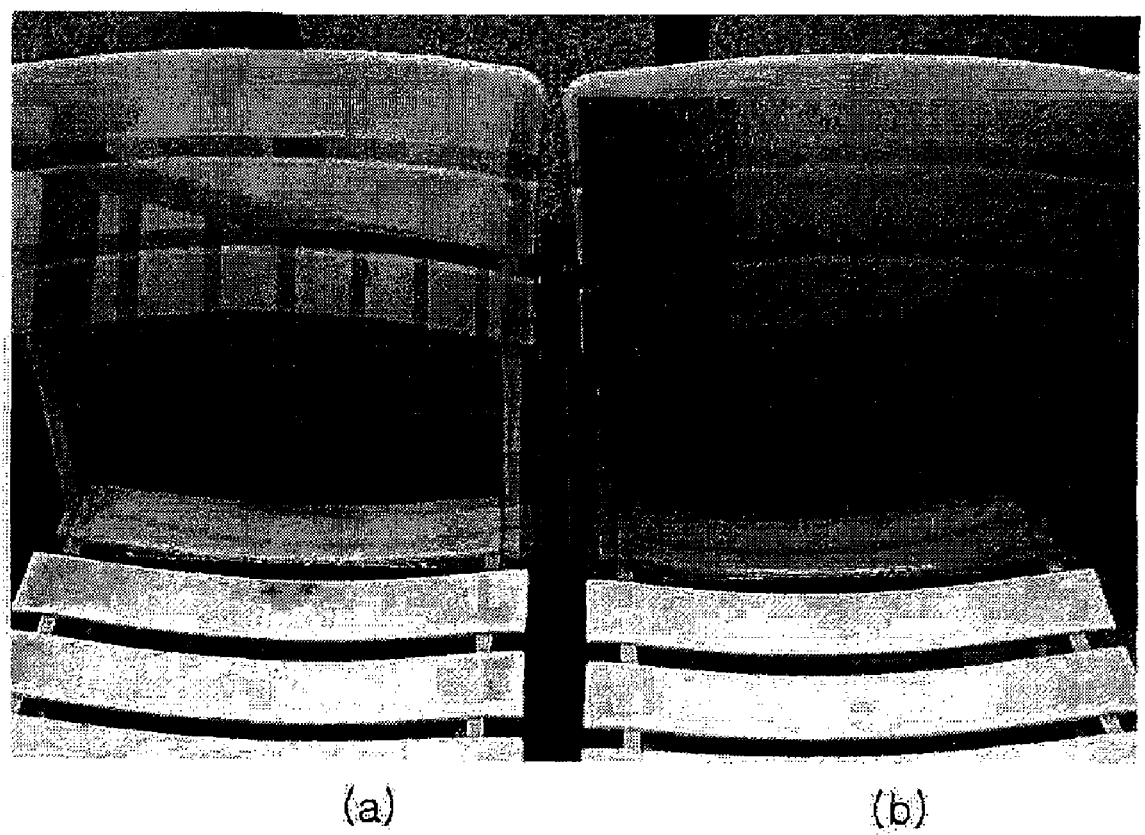
FIG. 21 comprises two photographs identified as (a) and (b) which depict the thin films of $TiO_{2-X-\delta}C_XN_\delta$ pre-heat treated and after heat treated that were exposed to open air in order to test the superhydrophilicity of the thin films of $TiO_{2-X-\delta}C_XN_\delta$.

FIG. 21 shows photographs of the thin films of $TiO_{2-X-\delta}C_XN_\delta$ according to the present invention that were prepared as a mirror having a size of 400 mm×400 mm, and then the mirrors were exposed outside while raining before heat treatment (a) and after heat treatment (b) to determine their hydrophilic properties. The hydrophilic mirror of heat treated $TiO_{2-X-\delta}C_XN_\delta$ (a) maintained its low contact angle, thereby forming optically clear paths, indicating that it is clean and clear. However, the pre-heat treated mirror (b) was formed with raindrops.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method to prepare titanium oxide-based photocatalysts and self-cleaning materials having a general formula of $TiO_{2-X-\delta}C_XN_\delta$, wherein $0<X+\delta<0.22$, $0<X<0.2$, and $0<\delta<0.02$, comprising:
   (1) forming a thin film on a substrate using an inert gas, a mixed gas consisting of $N_2$ and CO, and a metal Ti by a reactive sputtering; and
   (2) heat treating the formed thin film at a temperature between 450° C. and 500° C. for 2 to 4 hours.

2. The method to prepare titanium oxide-based photocatalysts and self-cleaning materials having a general formula of $TiO_{2-X-\delta}C_XN_\delta$ of claim 1, wherein the inert gas is argon (Ar) gas.

3. The method to prepare titanium oxide-based photocatalysts and self-cleaning materials having a general formula of $TiO_{2-X-\delta}C_XN_\delta$ of claim 2, wherein the mixed gas has $N_2$:CO ratio of 10:1 to 5:6.

4. Titanium oxide-based photocatalysts and self-cleaning materials having a general formula of $TiO_{2-X-\delta}C_XN_\delta$, wherein $0<X+\delta<0.22$, $0<X<0.2$, and $0<\delta<0.02$, prepared by using a method of claim 2.

5. The method to prepare titanium oxide-based photocatalysts and self-cleaning materials having a general formula of $TiO_{2-X-\delta}C_XN_\delta$ of claim 1, wherein the substrate can be any one selected from the group consisting of glass, metal and ceramic plates.

6. The method to prepare titanium oxide-based photocatalysts and self-cleaning materials having a general formula of $TiO_{2-X-\delta}C_XN_\delta$ of claim 5, wherein the mixed gas has $N_2$:CO ratio of 10:1 to 5:6.

7. Titanium oxide-based photocatalysts and self-cleaning materials having a general formula of $TiO_{2-X-\delta}C_XN_\delta$, wherein $0<X+\delta<0.22$, $0<X<0.2$, and $0<\delta<0.02$, prepared by using a method of claim 5.

8. The method to prepare titanium oxide-based photocatalysts and self-cleaning materials having a general formula of $TiO_{2-X-\delta}C_XN_\delta$ of claim 1, wherein the mixed gas has $N_2$:CO ratio of 10:1 to 5:6.

9. The method to prepare titanium oxide-based photocatalysts and self-cleaning materials having a general formula of $TiO_{2-X-\delta}C_XN_\delta$ of claim 8, wherein the heat treatment step (2) is performed at 500° C. for 4 hours.

10. Titanium oxide-based photocatalysts and self-cleaning materials having a general formula of $TiO_{2-X-\delta}C_XN_\delta$, wherein $0<X+\delta<0.22$, $0<X<0.2$, and $0<\delta<0.02$, prepared by using a method of claim 9.

11. Titanium oxide-based photocatalysts and self-cleaning materials having a general formula of $TiO_{2-X-\delta}C_XN_\delta$, wherein $0<X+\delta<0.22$, $0<X<0.2$, and $0<\delta<0.02$, prepared by using the method of claim 1.

12. The titanium oxide-based photocatalysts and self-cleaning materials having a general formula of $TiO_{2-X-\delta}C_XN_\delta$ of claim 11 characterized by having anatase crystallization phase.

13. The titanium oxide-based photocatalysts and self-cleaning materials having a general formula of $TiO_{2-X-\delta}C_XN_\delta$ of claim 12, wherein $x=\delta$.

14. The titanium oxide-based photocatalysts and self-cleaning materials having a general formula of $TiO_{2-X-\delta}C_XN_\delta$ of claim 12, wherein $x>\delta$.

15. The titanium oxide-based photocatalysts and self-cleaning materials having a general formula of $TiO_{2-X-\delta}C_XN_\delta$ of claim 11, wherein the thin film has an average diameter of 30 nm or less.

16. The titanium oxide-based photocatalysts and self-cleaning materials having a general formula of $TiO_{2-X-\delta}C_XN_\delta$ of claim 15, wherein $x=\delta$.

17. The titanium oxide-based photocatalysts and self-cleaning materials having a general formula of $TiO_{2-X-\delta}C_XN_\delta$ of claim 15, wherein $x>\delta$.

18. The titanium oxide-based photocatalysts and self-cleaning materials having a general formula of $TiO_{2-X-\delta}C_XN_\delta$ of claim 11, wherein $x=\delta$.

19. The titanium oxide-based photocatalysts and self-cleaning materials having a general formula of $TiO_{2-X-\delta}C_XN_\delta$ of claim 11, wherein $x>\delta$.

20. Titanium oxide-based material having a general formula of $TiO_{2-X-\delta}C_XN_\delta$, wherein $0<X+\delta<0.22$, $0<X<0.2$, and $0<\delta<0.02$.

21. The titanium oxide-based material having a general formula of $TiO_{2-X-\delta}C_XN_\delta$ of claim 20 having an anatase crystallization phase.

22. The titanium oxide-based thin film material having a general formula of $TiO_{2-X-\delta}C_XN_\delta$ of claim 21, wherein $x=\delta$.

23. The titanium oxide-based thin film material having a general formula of $TiO_{2-X-\delta}C_XN_\delta$ of claim 21, wherein $x>\delta$.

24. The titanium oxide-based thin film material having a general formula of $TiO_{2-X-\delta}C_XN_\delta$ of claim 20, wherein $x=\delta$.

25. The titanium oxide-based thin film material having a general formula of $TiO_{2-X-\delta}C_XN_\delta$ of claim 20, wherein $x>\delta$.

* * * * *